US012333987B2

(12) United States Patent
Zhang et al.

(10) Patent No.: US 12,333,987 B2
(45) Date of Patent: Jun. 17, 2025

(54) DRIVING METHOD OF DISPLAY PANEL AND DISPLAY DEVICE INCLUDING DISPLAY PANEL

(71) Applicant: TCL CHINA STAR OPTOELECTRONICS TECHNOLOGY CO., LTD., Guangdong (CN)

(72) Inventors: Yuning Zhang, Guangdong (CN); Shuming Chang, Guangdong (CN); Yating Wen, Guangdong (CN); Fan Chen, Guangdong (CN); Zhaoming Liang, Guangdong (CN); Weisheng Zheng, Guangdong (CN); Qian Wang, Guangdong (CN); Shijie Deng, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/399,256

(22) Filed: Dec. 28, 2023

(65) Prior Publication Data

US 2025/0157382 A1 May 15, 2025

(30) Foreign Application Priority Data

Nov. 14, 2023 (CN) ......................... 202311523967.3

(51) Int. Cl.
*G09G 3/20* (2006.01)

(52) U.S. Cl.
CPC ... *G09G 3/2074* (2013.01); *G09G 2320/0209* (2013.01); *G09G 2320/0233* (2013.01)

(58) Field of Classification Search
CPC ......... G09G 3/2074; G09G 2320/0209; G09G 2320/0233
See application file for complete search history.

(56) References Cited

U.S. PATENT DOCUMENTS

2017/0186353 A1* 6/2017 Hwang ................ G09G 3/3648
2019/0035323 A1* 1/2019 Jian ...................... G09G 3/3677

* cited by examiner

*Primary Examiner* — Kwang-Su Yang
(74) *Attorney, Agent, or Firm* — HSML P.C.

(57) ABSTRACT

A driving method of a display panel includes: obtaining first initial voltage values respectively corresponding to N sub-pixels on a first data line and second initial voltage values respectively corresponding to the N sub-pixels on a second data line in a first initial picture, and third initial voltage values respectively corresponding to 1st to Mth sub-pixels of the N sub-pixels on the first data line and fourth initial voltage values respectively corresponding to the 1st to Mth sub-pixels on the second data line in a second initial picture following the first initial picture; calculating a voltage compensation value for the Mth sub-pixel based on the corresponding first, second, third, and fourth initial voltage value; calculating a target voltage value for the Mth sub-pixel based on the voltage compensation value; and displaying the second initial picture based on the target voltage value.

18 Claims, 7 Drawing Sheets

DRIVING METHOD OF DISPLAY PANEL AND DISPLAY DEVICE INCLUDING DISPLAY PANEL

CROSS-REFERENCE TO RELATED APPLICATION

This application claims priority to Chinese Patent Application No. 202311523967.3, filed on Nov. 14, 2023, the disclosure of which is incorporated herein by reference in its entirety.

TECHNICAL FIELD

The present disclosure relates to display technologies, and in particular, to a driving method of a display panel and a display device including the display panel.

BACKGROUND

Due to a limitation of manufacturing process, a pixel of an existing display panel cannot be accurately positioned in the middle between two adjacent data lines. The unequal distances between the pixel and the two adjacent data lines result in different coupling capacitances between the pixel and the two adjacent data lines respectively on the left and right sides of the pixel, which causes change in voltage values of pixel electrodes of two corresponding pixels, and therefore the luminance of the two corresponding pixels, which results in vertical crosstalk and reducing display quality.

SUMMARY

In one aspect, some embodiments of the present disclosure provide a driving method of a display panel. The display panel includes: a first data line, a second data line adjacent to the first data line, and a sub-pixel column disposed between the first data line and the second data line, the sub-pixel column including N sub-pixels. The driving method includes: obtaining first initial voltage values respectively corresponding to the N sub-pixels on the first data line in a first initial picture, second initial voltage values respectively corresponding to the N sub-pixels on the second data line in the first initial picture, third initial voltage values respectively corresponding to 1st to Mth sub-pixels of the N sub-pixels on the first data line in a second initial picture following the first initial picture, and fourth initial voltage values respectively corresponding to the 1st to Mth sub-pixels on the second data line in the second initial picture, wherein M is less than or equal to N, and both M and N are positive integers; calculating a voltage compensation value for the Mth sub-pixel based on the first initial voltage value, the second initial voltage value, the third initial voltage value, and the fourth initial voltage value corresponding to the Mth sub-pixel; calculating a target voltage value for the Mth sub-pixel based on the voltage compensation value; and displaying the second initial picture based on the target voltage value.

In another aspect, some embodiments of the present disclosure provide a display device including a display panel and a drive circuit electrically connected to the display panel. The display panel includes at least: a first data line, a second data line adjacent to the first data line, and a sub-pixel column disposed between the first data line and the second data line, the sub-pixel column comprising N sub-pixels. The drive circuit includes: an obtaining module configured to obtain first initial voltage values respectively corresponding to the N sub-pixels on the first data line in a first initial picture, second initial voltage values respectively corresponding to the N sub-pixels on the second data line in the first initial picture, third initial voltage values respectively corresponding to 1st to Mth sub-pixels of the N sub-pixels on the first data line in a second initial picture following the first initial picture, and fourth initial voltage values respectively corresponding to the 1st to Mth sub-pixels on the second data line in the second initial picture, wherein M is less than or equal to N, and both M and N are positive integers; a calculating module configured to calculate a voltage compensation value for the Mth sub-pixel based on the first initial voltage value, the second initial voltage value, the third initial voltage value, and the fourth initial voltage value corresponding to the Mth sub-pixel, and calculate a target voltage value for the Mth sub-pixel based on the voltage compensation value; and a driving module configured to display the second initial picture based on the target voltage value.

In still another aspect, some embodiments of the present disclosure provide a display device including a display panel and a drive circuit electrically connected to the display panel. The display panel includes at least: a first data line, a second data line adjacent to the first data line, and a sub-pixel column disposed between the first data line and the second data line, the sub-pixel column comprising N sub-pixels. The drive circuit includes a chip, and the chip stores a plurality of computer programs executable by the chip to perform a driving method of the display panel. The driving method includes: obtaining first initial voltage values respectively corresponding to the N sub-pixels on the first data line in a first initial picture, second initial voltage values respectively corresponding to the N sub-pixels on the second data line in the first initial picture, third initial voltage values respectively corresponding to 1st to Mth sub-pixels of the N sub-pixels on the first data line in a second initial picture following the first initial picture, and fourth initial voltage values respectively corresponding to the 1st to Mth sub-pixels on the second data line in the second initial picture, wherein M is less than or equal to N, and both M and N are positive integers; calculating a voltage compensation value for the Mth sub-pixel based on the first initial voltage value, the second initial voltage value, the third initial voltage value, and the fourth initial voltage value corresponding to the Mth sub-pixel; calculating a target voltage value for the Mth sub-pixel based on the voltage compensation value; and displaying the second initial picture based on the target voltage value.

DETAILED DESCRIPTION

The technical solutions in some embodiments of the present disclosure will be described below with reference to the drawings. The described technical solutions are only used to explain and illustrate the ideas of the present disclosure and should not be regarded as limiting the protection scope of the present disclosure.

The various embodiments provided in the present disclosure are similar, and features in different embodiments can be combined with each other.

Figure 1A:
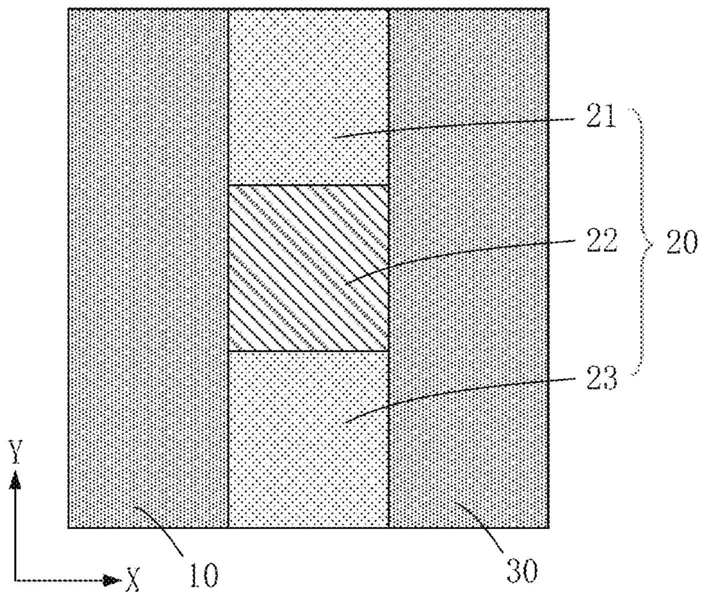
FIG. 1*a* is a schematic diagram showing vertical crosstalk phenomenon in an initial picture provided by an existing display panel.
Figure 1B:
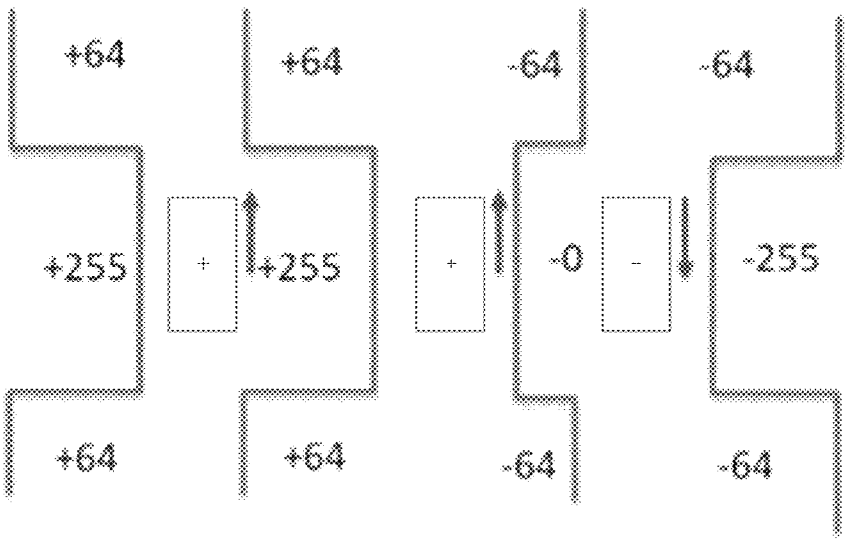
FIG. 1*b* is a schematic diagram of a principle of a cause of the vertical crosstalk phenomenon in FIG. 1*a*.

As shown in FIGS. 1*a* and 1*b*, an existing display picture has a first display area 10, a second display area 20, and a third display are 30 arranged along a first direction X. The second display area 20 includes a first display sub-area 21, a second display sub-area 22, and a third display area 23 arranged along a second direction Y, where the second display sub-area 22 is located between the third display sub-area 23 and the first display sub-area 21.

It should be noted that the first direction X is a direction along which a scan line extends, and the second direction Y is a direction along which a data line extends.

Due to the influence of the second display sub-area 22, the first display sub-area 21 and/or the third display sub-area 23 is/are brighter or darker than the first display area 10 and/or the third display area 30, displaying a picture with a gray background and a color frame, which is specifically, due to unequal voltage values on left and right sides of a pixel. Besides, unequal distances between the pixel and the data lines on its left and right sides result in asymmetric parasitic capacitances between the pixel and the data lines on its left and right sides, thereby causing vertical crosstalk.

Figure 2A:
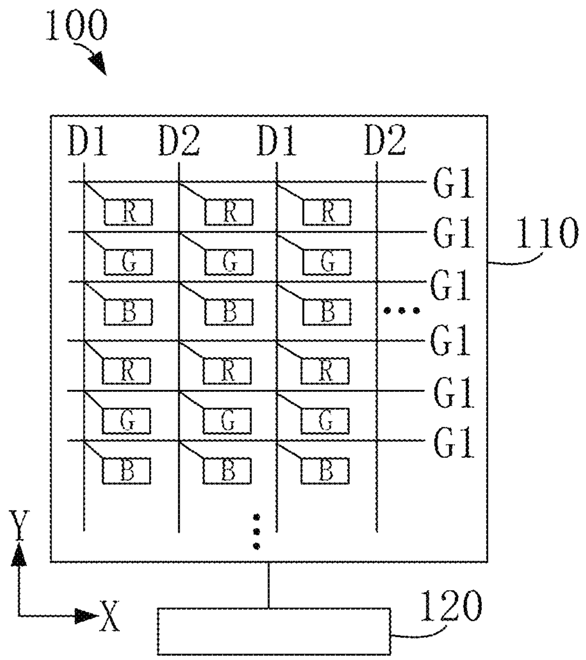
FIG. 2*a* is a schematic diagram of a display device according to some embodiments of the present disclosure.

As shown in FIG. 2*a*, some embodiments of the present disclosure provide a display device 100 including a display panel 110 and a drive circuit 120. The display panel 110 is electrically connected to the drive circuit 120. The display panel 110 at least includes a first data line D1, a second data line D2 adjacent to the first data line D1, and a sub-pixel column disposed between the first data line D1 and the second data line D2. The sub-pixel column includes N sub-pixels (R/G/B). Specifically, the display panel 110 includes a plurality of first data lines D1 and a plurality of second data lines D2 arranged at intervals along the first direction X. The display panel 110 further includes scan lines G1 arranged at intervals along the second direction Y A sub-pixel row is provided between two adjacent scan lines G1. Each scan line G1 is electrically connected to a plurality of sub-pixels (RIG/B) in one sub-pixel row. Each sub-pixel column includes a first sub-pixel R, a second sub-pixel G, and a third sub-pixel B arranged at intervals along the second direction Y The N sub-pixels (RIG/B) in each sub-pixel column are electrically connected to a corresponding first data line D1 or a corresponding second data line D2. The first sub-pixel R, the second sub-pixel G, and the third sub-pixel B have different colors. For example, the first sub-pixel R is a red sub-pixel, the second sub-pixel G is a green sub-pixel, and the third sub-pixel B is a blue sub-pixel. In some embodiments, the sub-pixels can have other colors.

Figure 2B:
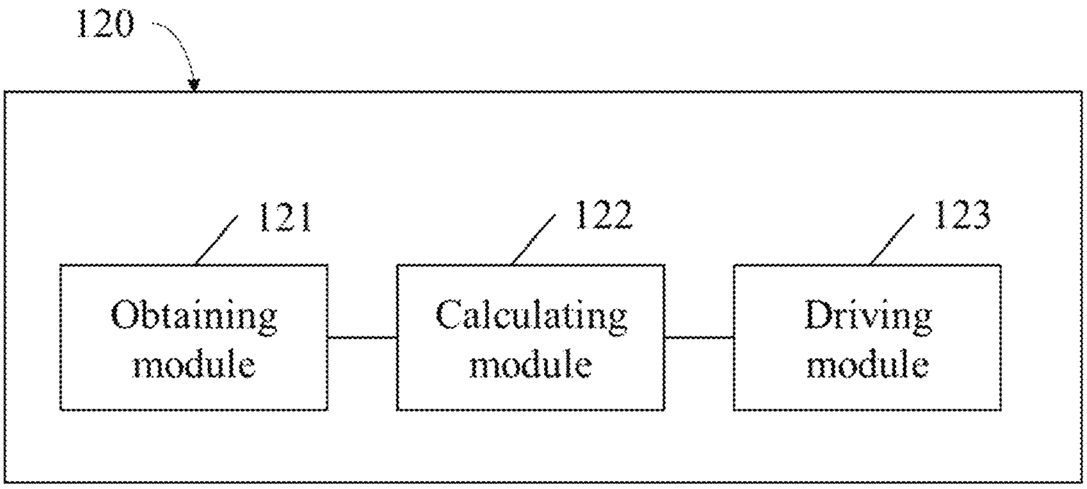
FIG. 2*b* is a schematic diagram of a drive circuit in the display device provided in FIG. 2*a*.

As shown in FIG. 2*b*, the drive circuit 120 includes: an obtaining module 121, a calculating module 122, and a driving module 123.

Referring to FIG. 2*a*, the display panel 110 includes a plurality of sub-pixel columns. Each of the sub-pixel columns includes N sub-pixels, is disposed between two adjacent data lines D1 and D2, and is connected to the two adjacent data lines D1 and D2. The drive circuit 120 is electrically connected to the display panel 110 and is configured to drive the display panel 110. A sub-pixel column of the plurality of sub-pixel columns in the display panel 110 is taken as an example to describe the structure of the drive circuit 120 and the functions thereof.

In some embodiments, the obtaining module 121 is configured to obtain first initial voltage values corresponding to the N sub-pixels on the first data line in a first initial picture, second initial voltage values corresponding to the N sub-pixels on the second data line in the first initial picture, third initial voltage values corresponding to 1st to Mth sub-pixels on the first data line in a second initial picture following the first initial picture, and fourth initial voltage values corresponding to the 1st to Mth sub-pixels on the second data line in the second initial picture, where M is less than or equal to N, and both M and N are positive integers.

In some embodiments, the calculating module 122 is configured to calculate a voltage compensation value for the Mth sub-pixel based on the first initial voltage value, the second initial voltage value, the third initial voltage value, and the fourth initial voltage value corresponding to the Mth sub-pixel, and calculate a target voltage value for the Mth sub-pixel based on the voltage compensation value.

In some embodiments, the driving module 123 is configured to display the second initial picture based on the target voltage value.

The display device 100 provided by some embodiments of the present disclosure obtains voltage compensation values corresponding to two adjacent data lines in two consecutively displayed display pictures, adjusts initial voltage values of a pixel column between the two adjacent data lines based on the voltage compensation values to obtain corresponding target voltage values, and displays the second initial picture according to the target voltage values, which may address the vertical crosstalk caused by asymmetric parasitic capacitances between a pixel and the data lines on its left and right sides and improve the display quality.

In some embodiments of the present disclosure, the display panel of the display device 100 may be a liquid crystal display (LCD) panel based on thin film transistor LCD technology, an organic light emitting diode (OLED) display panel based on OLED technology, a quantum-dot light-emitting diode (QD-LED) based on QD-LED technology, etc.

In some embodiments, the drive circuit of the display device 100 may include a chip storing a plurality of computer programs. The computer programs may be executable by the chip to perform a driving method of the display panel, for example, the driving methods of the display panel as described in FIGS. 3-8.

Figure 3:
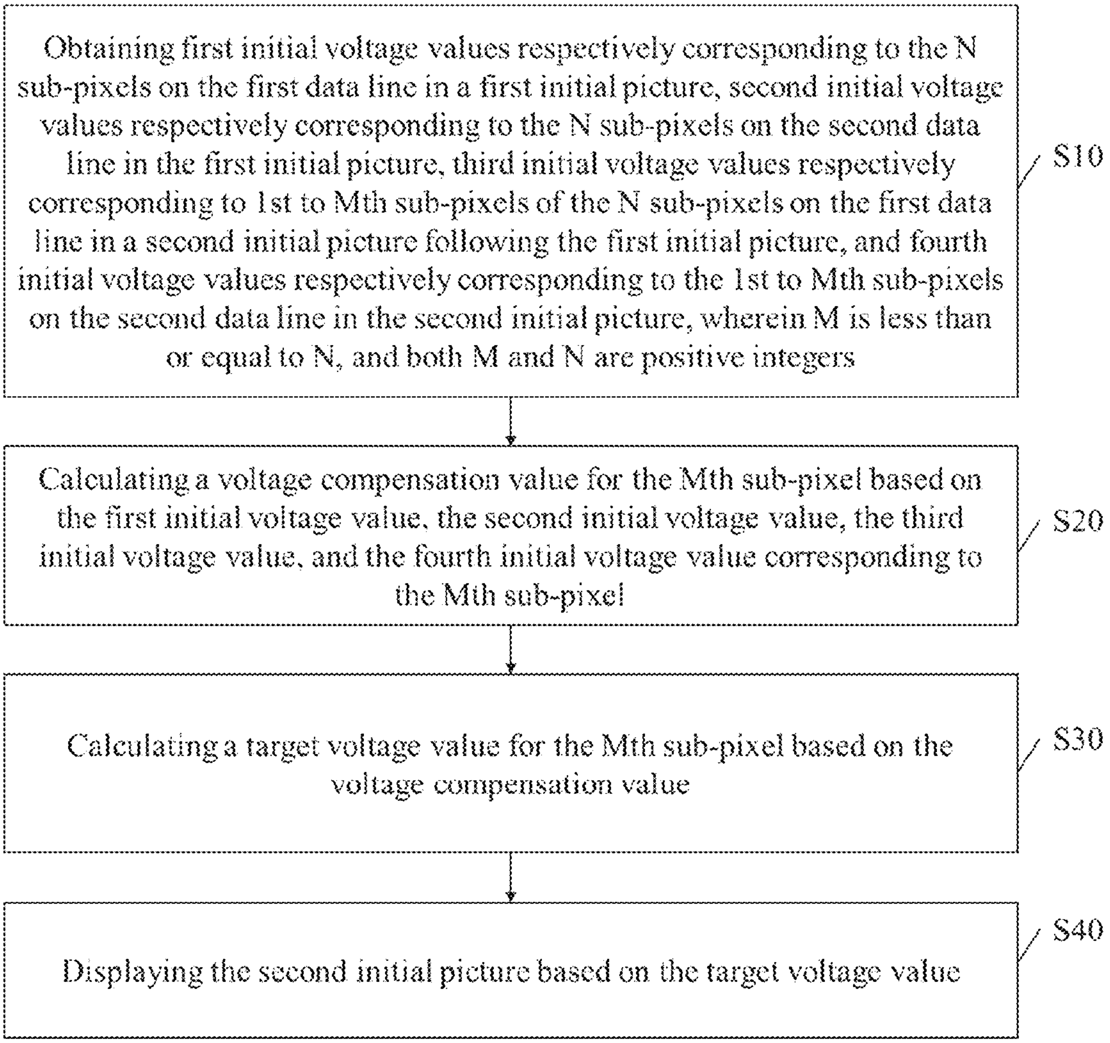
FIG. 3 is a flow chart of a driving method of a display panel according to some embodiments of the present disclosure.

As shown in FIG. 3, some embodiments of the present disclosure provide a driving method of a display panel. The display panel at least includes a first data line, a second data line adjacent to the first data line, and a sub-pixel column disposed between the first data line and the second data line. The sub-pixel column includes N sub-pixels. The driving method includes the following operations.

In operation S10, first initial voltage values corresponding to the N sub-pixels on the first data line in a first initial picture, second initial voltage values corresponding to the N sub-pixels on the second data line in the first initial picture, third initial voltage values corresponding to the 1st to Mth sub-pixels on the first data line in a second initial picture following the first initial picture, and fourth initial voltage values corresponding to the 1st to Mth sub-pixels on the second data line in the second initial picture are obtained, where M is less than or equal to N, and both M and N are positive integers.

Figure 4:
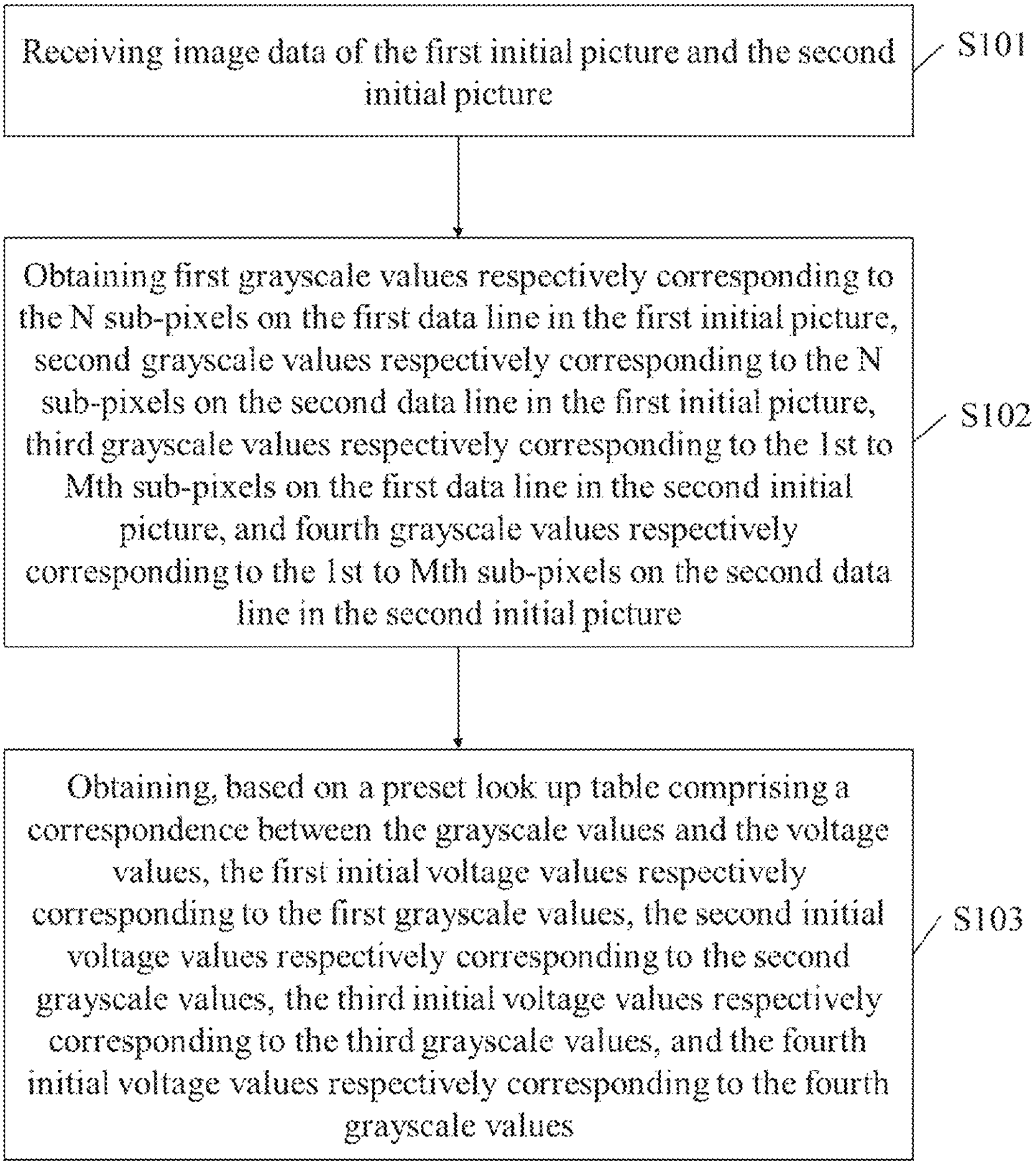
FIG. 4 is a flow chart of sub-operations of an operation S10 in FIG. 3.

As shown in FIG. 4, the operation S10 includes the following sub-operations.

In sub-operation S101, image data of the first initial picture and the second initial picture that are displayed consecutively are received.

In some embodiments, grayscale values, driving voltage values, chromaticity, or the like of the pixels in the continuously displayed first initial picture and second initial picture are received.

In sub-operation S102, first grayscale values corresponding to the N sub-pixels on the first data line in the first initial picture, second grayscale values corresponding to the N sub-pixels on the second data line in the first initial picture, third grayscale values corresponding to the 1st to Mth sub-pixels on the first data line in the second initial picture, and fourth grayscale values corresponding to the 1st to Mth sub-pixels on the second data line in the second initial picture are obtained.

In some embodiments, the grayscale values corresponding to multiple sub-pixels of the sub-pixel column may be the same or different. If the grayscale values corresponding to the multiple sub-pixels of the sub-pixel column are different, the grayscale values corresponding to the multiple sub-pixels of the sub-pixel column are obtained respectively.

In sub-operation S103, the first initial voltage values corresponding to the first grayscale values, the second initial voltage values corresponding to the second grayscale values, the third initial voltage values corresponding to the third grayscale values, and the fourth initial voltage values corresponding to the fourth grayscale values are obtained based on a preset look up table. The preset look up table includes a correspondence between grayscale values and voltage values.

In some embodiments, the driving method of the display panel further includes establishing the correspondence between the grayscale values and the voltage values. The initial voltage values corresponding to various grayscale values are obtained according to the correspondence between the grayscale values and the voltage values.

In operation S20, a voltage compensation value for the Mth sub-pixel is calculated based on the first initial voltage value, the second initial voltage value, the third initial voltage value, and the fourth initial voltage value corresponding to the Mth sub-pixel.

In some embodiments, during a display period of the first initial picture, the first data line provides the first initial voltage values to an input terminal of the first data line, and the second data line provides the second initial voltage values to an input terminal of the second data line. During a display period of the second initial picture, the first data line provides the third initial voltage values to the input terminal of the first data line, and the second data line provides the fourth initial voltage values to the input terminal of the second data line.

Figure 5:
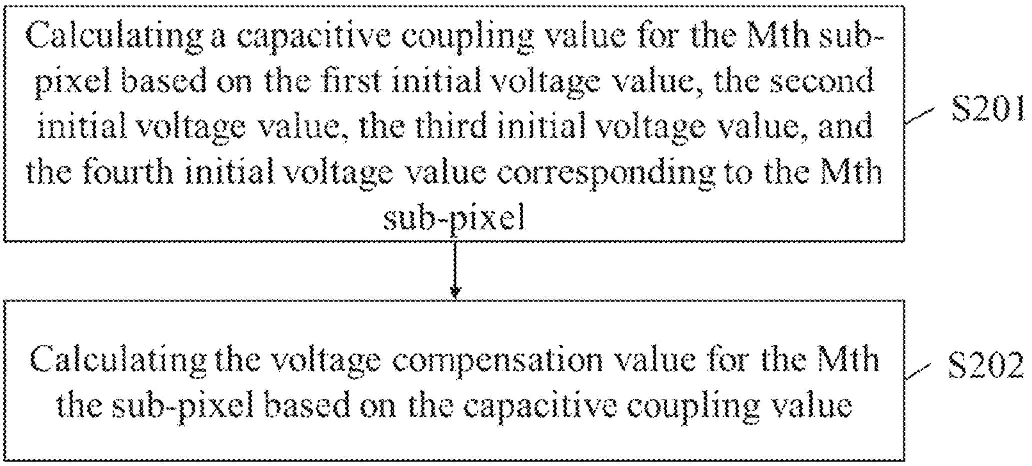
FIG. 5 is a flow chart of sub-operations of an operation S20 in FIG. 3.

As shown in FIG. 5, the operation S20 includes the following sub-operations.

In sub-operation S201, a capacitive coupling value is calculated for the Mth sub-pixel based on the first initial voltage value, the second initial voltage value, the third initial voltage value, and the fourth initial voltage value corresponding to the Mth sub-pixel.

Figure 6:
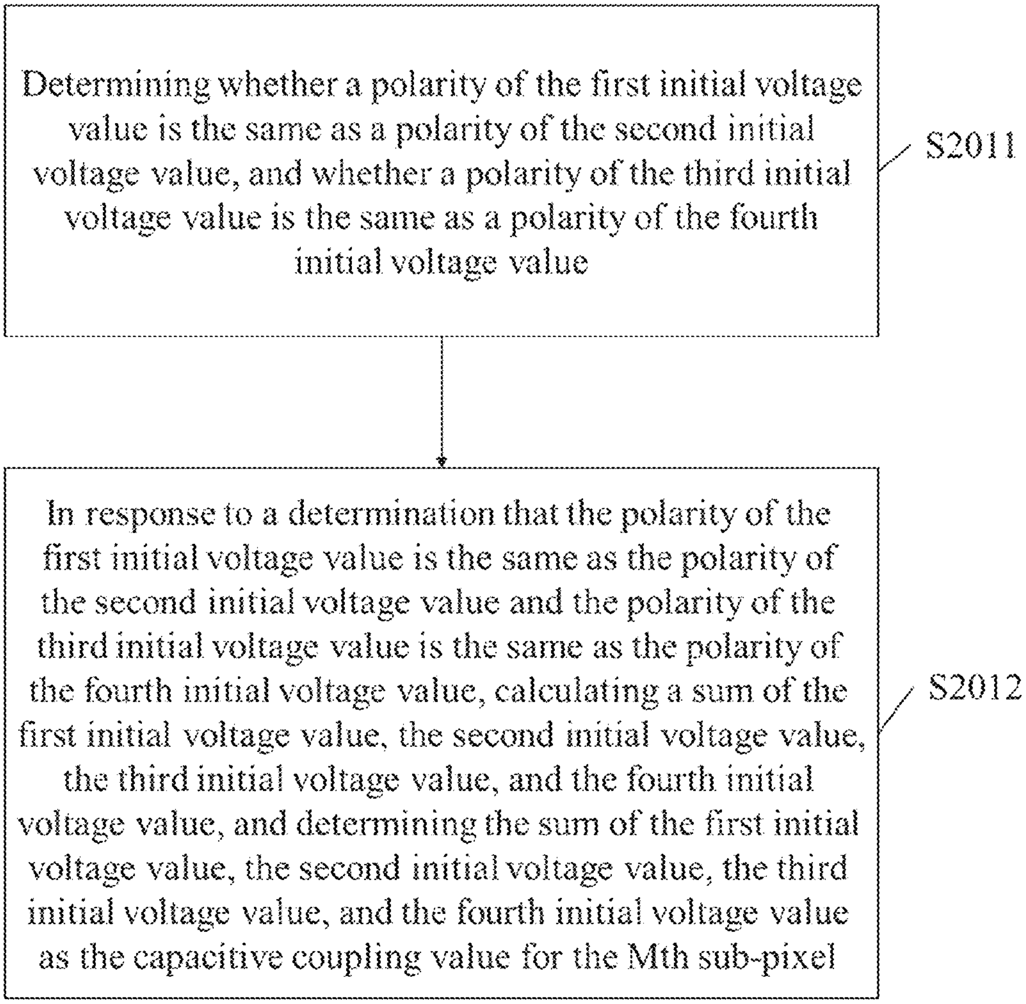
FIG. 6 is a flow chart of sub-operations of an operation S201 in FIG. 5.

As shown in FIG. 6, the sub-operation S201 includes the following sub-operations:

In sub-operation S2011, determination is made for the Mth sub-pixel as to whether a polarity of the first initial voltage value is the same as a polarity of the second initial voltage value and whether a polarity of the third initial voltage value is the same as a polarity of the fourth initial voltage value.

In some embodiments, the polarity of the first initial voltage value and the polarity of the third initial voltage value may be the same or opposite, and the polarity of the second initial voltage value and the polarity of the fourth initial voltage value may be the same or opposite.

In sub-operation S2012, in response to the determination that the polarity of the first initial voltage value is the same as the polarity of the second initial voltage value and the polarity of the third initial voltage value is the same as the polarity of the fourth initial voltage value, a sum of the first initial voltage value, the second initial voltage value, the third initial voltage value, and the fourth initial voltage value is calculated and determined as the capacitive coupling value for the Mth sub-pixel.

For example, if the polarities of the first initial voltage value and the second initial voltage value are both positive, and the polarities of third initial voltage value and the fourth initial voltage value are both positive or negative, the sum of the first initial voltage value, the second initial voltage value, the third initial voltage value, and the fourth initial voltage value is calculated to obtain the capacitive coupling value of the Mth sub-pixel.

In some embodiments, the capacitive coupling value $G_{coup}$ is calculated according to Formula 1:

$$G_{coup}=((V_{preR}+V_{preL})+(V_{curL}+V_{curR})) \quad \text{(Formula 1)},$$

where $G_{coup}$ represents the capacitive coupling value, $V_{preR}$ represents the second initial voltage value of the second data line in the first initial picture, $V_{preL}$ represents the first initial voltage value of the first data line in the first initial picture, $V_{curL}$ represents the third initial voltage value of the first data line in the second initial picture, and $V_{curR}$ represents the fourth initial voltage value of the second data line in the second initial picture.

Figure 7:
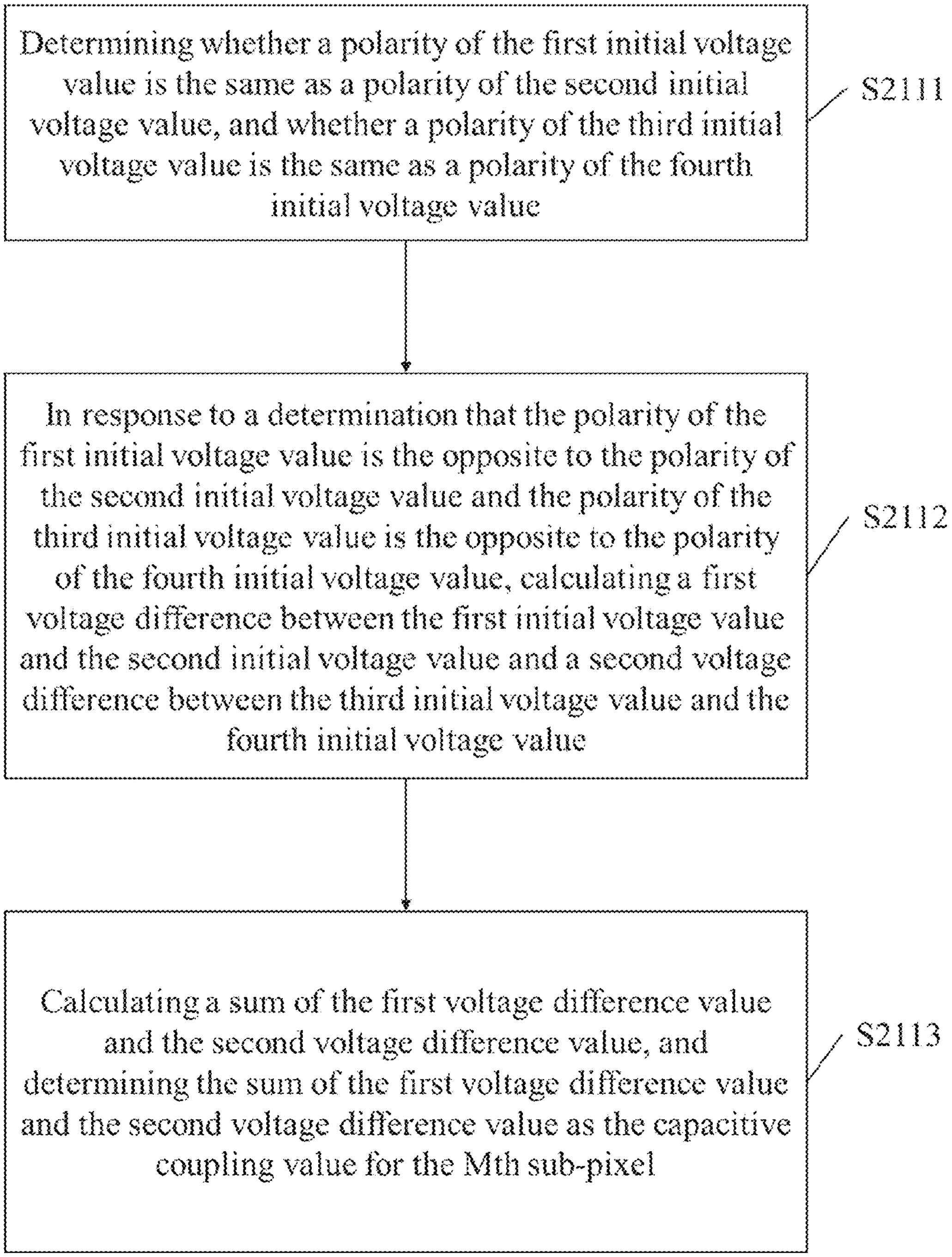
FIG. 7 is another flow chart of sub-operations of the operation S201 in FIG. 5.

As shown in FIG. 7, in some other embodiments, the sub-operation S201 includes the following sub-operations.

In sub-operation S2111, determination is made for the Mth sub-pixel as to whether a polarity of the first initial voltage value is the same as a polarity of the second initial voltage value, and whether a polarity of the third initial voltage value is the same as a polarity of the fourth initial voltage value.

In some embodiments, the polarities of the first initial voltage value and the third initial voltage value may be the same or opposite, and the polarities of the second initial voltage value and the fourth initial voltage value may be the same or opposite.

In sub-operation S2112, in response to the determination that the polarity of the first initial voltage value is the opposite of the polarity of the second initial voltage value and the polarity of the third initial voltage value is the opposite of the polarity of the fourth initial voltage value, a first voltage difference between the first initial voltage value and the second initial voltage value and a second voltage difference between the third initial voltage value and the fourth initial voltage value are calculated.

For example, if the polarity of the first initial voltage value is negative, the polarity of the second initial voltage value is positive, the polarity of the third initial voltage value is positive, and the polarity of the fourth initial voltage value is negative, the first voltage difference between the first initial voltage value and the second initial voltage value is calculated, and the second voltage difference between the third initial voltage value and the fourth initial voltage value is calculated.

In sub-operation S2113, a sum of the first voltage difference value and the second voltage difference value is calculated and determined as the capacitive coupling value for the Mth sub-pixel.

In some embodiments, the capacitive coupling value $G_{coup}$ is calculated according to Formula 2:

$$G_{coup}=((V_{preR}-V_{preL})+(V_{curL}-V_{curR})) \quad \text{(Formula 2)},$$

where $G_{coup}$ represents the capacitive coupling value, $V_{preR}$ represents the second initial voltage value of the second data line in the first initial picture, $V_{preL}$ represents the first initial voltage value of the first data line in the first initial picture, $V_{curL}$ represents the third initial voltage value of the first data line in the second initial picture, and $V_{cur}$R represents the fourth initial voltage value of the second data line in the second initial picture.

In sub-operation S202, the voltage compensation value is calculated for the Mth the sub-pixel based on the capacitive coupling value.

In some embodiments, the voltage compensation value Reg is calculated according to Formula 3:

$$Reg=G_{coup}*\text{Gain/Image Height} \quad \text{(Formula 3)},$$

where Reg represents the voltage compensation value, $G_{coup}$ represents the capacitive coupling value, Gain represents a compensation coefficient, and Image-Height represents the number of pixel rows.

Figure 8:
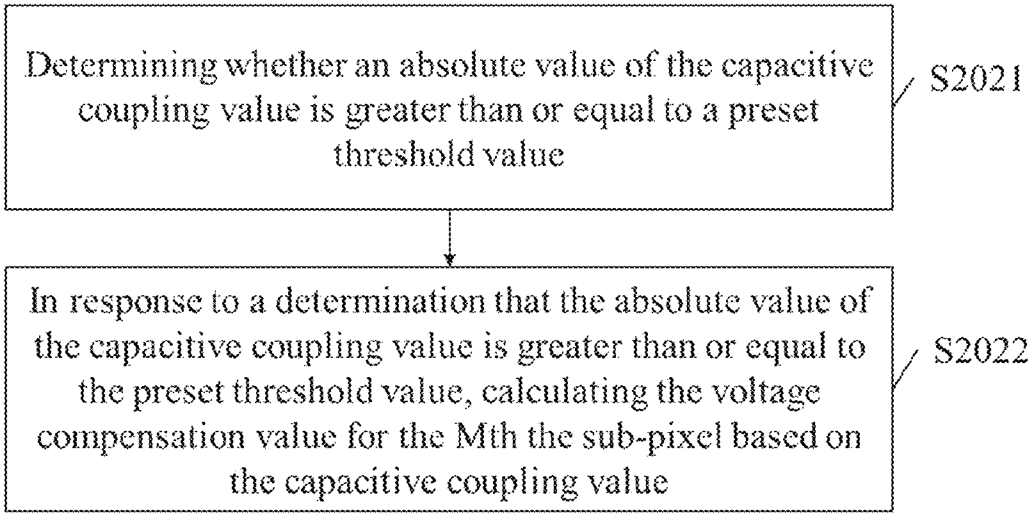
FIG. 8 is a flow chart of sub-operations of an operation S202 in FIG. 5.

As shown in FIG. 8, the sub-operation S202 includes the following sub-operations.

In sub-operation S2021, determination is made as to whether an absolute value of the capacitive coupling value is greater than or equal to a preset threshold value.

In some embodiments, in response to the determination that the absolute value of the capacitive coupling value is less than the preset threshold, no voltage value compensation is performed on the sub-pixel column, so as to reduce the power consumption of the display panel.

In sub-operation S2022, in response to the determination that the absolute value of the capacitive coupling value is greater than or equal to the preset threshold value, the voltage compensation value is calculated for the Mth the sub-pixel based on the capacitive coupling value.

For example, if the absolute value of the capacitive coupling value is greater than or equal to the preset threshold value, a first voltage compensation value of the first data line in the first initial picture, a second voltage compensation value of the second data line in the first initial picture, a third voltage compensation value of the first data line in the second initial picture, and a fourth voltage compensation value of the second data line in the second initial picture are calculated based on the capacitive coupling value.

In some embodiments, if the absolute value of the capacitive coupling value is greater than the preset threshold, it indicates that vertical crosstalk occurs in the initial picture. As mentioned above, the cause of the vertical crosstalk between pixels is that the distances between the pixel and the two adjacent data lines are not equal, which causes different parasitic capacitance between the pixel and the data lines on the left and right sides, resulting in inconsistent influence to the pixel by the voltage values. Due to an uneven distribution of voltage values on two sides of the pixel, the effects of voltage values provided by the two adjacent data lines to the pixel cannot be offset, causing fluctuate in the voltage value of the pixel, which results in the phenomenon that the pixel becomes brighter or darker and a resulted visible color shift. Accordingly, in some embodiments, the first voltage compensation value of the first data line in the first initial picture, the second voltage compensation value of the second data line in the first initial picture, the third voltage compensation value of the first data line in the second initial picture, and the fourth voltage compensation value of the second data line in the second initial picture are calculated.

In operation S30, a target voltage value is calculated for the Mth sub-pixel based on the voltage compensation value.

For example, target voltage values corresponding to the first initial voltage value, the second initial voltage value, the third initial voltage value, and the fourth initial voltage value are determined for the Mth sub-pixel, based on the voltage compensation value.

In some embodiments, the target voltage values of the Mth sub-pixel are calculated according to Formula 4.

$$V_{out}=V_{in}-Reg \quad \text{(Formula 4)},$$

where Vout represents the target voltage values, Vin represents the initial voltage values of the Mth sub-pixel, and Reg represents the voltage compensation value.

In operation S40, the second initial picture is displayed based on the target voltage value.

Figure 9:
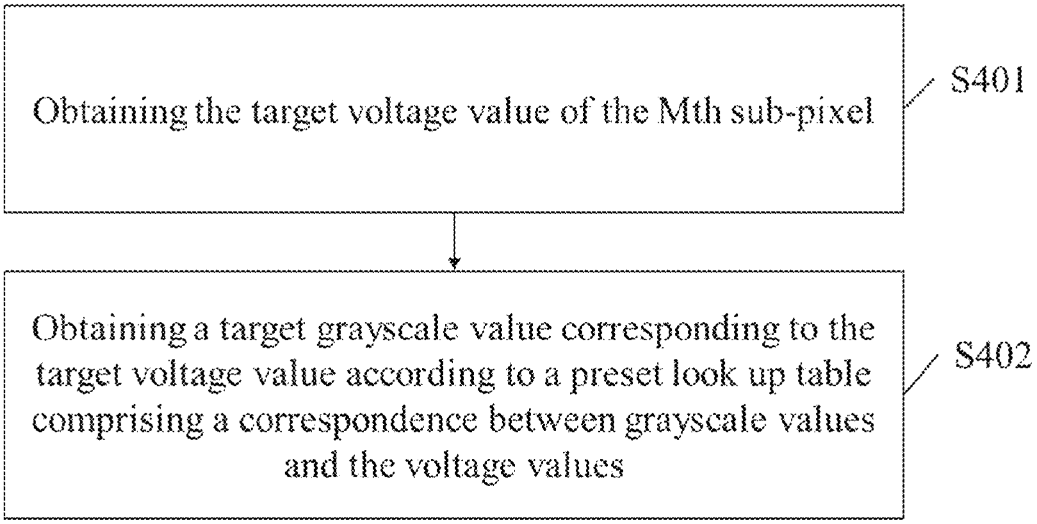
FIG. 9 is a flow chart of sub-operations of an operation S40 in FIG. 3.

As shown in FIG. 9, the operation S40 includes the following sub-operations.

In sub-operation S401, the target voltage values of the Mth sub-pixel are obtained.

In sub-operation S402, obtaining for the Mth sub-pixel target grayscale values corresponding to the target voltage values according to the preset look-up table, wherein the preset look-up table includes the correspondence between grayscale values and voltage values.

The display method of the display panel provided by some embodiments of the present disclosure obtains voltage compensation values corresponding to two adjacent data lines in two consecutively displayed display pictures, adjusts initial voltage values of a pixel column between the two adjacent data lines based on the voltage compensation values to obtain corresponding target voltage values, and displays the second initial picture according to the target voltage values, which may address the vertical crosstalk caused by asymmetric parasitic capacitances between a pixel and the data lines on its left and right sides and improve the display quality.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A driving method of a display panel, the display panel comprising a first data line, a second data line adjacent to the first data line, and a sub-pixel column disposed between the first data line and the second data line, the sub-pixel column comprising N sub-pixels, the driving method comprising:

obtaining first initial voltage values respectively corresponding to the N sub-pixels on the first data line in a first initial picture, second initial voltage values respectively corresponding to the N sub-pixels on the second data line in the first initial picture, third initial voltage values respectively corresponding to 1st to Mth sub-pixels of the N sub-pixels on the first data line in a second initial picture following the first initial picture, and fourth initial voltage values respectively corresponding to the 1st to Mth sub-pixels on the second data line in the second initial picture, wherein M is less than or equal to N, and both M and N are positive integers;

calculating a voltage compensation value for the Mth sub-pixel based on the first initial voltage value, the second initial voltage value, the third initial voltage value, and the fourth initial voltage value corresponding to the Mth sub-pixel;

calculating a target voltage value for the Mth sub-pixel based on the voltage compensation value; and displaying the second initial picture based on the target voltage value.

2. The driving method of the display panel according to claim 1, wherein the obtaining the first initial voltage values, the second initial voltage values, the third initial voltage values, and the fourth initial voltage values comprises:

receiving image data of the first initial picture and the second initial picture;

obtaining first grayscale values respectively corresponding to the N sub-pixels on the first data line in the first initial picture, second grayscale values respectively corresponding to the N sub-pixels on the second data line in the first initial picture, third grayscale values respectively corresponding to the 1st to Mth sub-pixels on the first data line in the second initial picture, and fourth grayscale values respectively corresponding to the 1st to Mth sub-pixels on the second data line in the second initial picture; and obtaining, based on a preset look up table comprising a correspondence between the grayscale values and the voltage values, the first initial voltage values respectively corresponding to the first grayscale values, the second initial voltage values respectively corresponding to the second grayscale values, the third initial voltage values respectively corresponding to the third grayscale values, and the fourth initial voltage values respectively corresponding to the fourth grayscale values.

3. The driving method of the display panel according to claim 1, wherein the calculating the voltage compensation value for the Mth sub-pixel comprises:

calculating a capacitive coupling value for the Mth sub-pixel based on the first initial voltage value, the second initial voltage value, the third initial voltage value, and the fourth initial voltage value corresponding to the Mth sub-pixel; and calculating the voltage compensation value for the Mth sub-pixel based on the capacitive coupling value.

4. The driving method of the display panel according to claim 3, wherein the calculating the capacitive coupling value for the Mth sub-pixel comprises:

determining whether a polarity of the first initial voltage value is the same as a polarity of the second initial voltage value, and whether a polarity of the third initial voltage value is the same as a polarity of the fourth initial voltage value;

in response to the determination that the polarity of the first initial voltage value is the same as the polarity of the second initial voltage value and the polarity of the third initial voltage value is the same as the polarity of the fourth initial voltage value, calculating a sum of the first initial voltage value, the second initial voltage value, the third initial voltage value, and the fourth initial voltage value; and determining the sum of the first initial voltage value, the second initial voltage value, the third initial voltage value, and the fourth initial voltage value as the capacitive coupling value for the Mth sub-pixel.

5. The driving method of the display panel according to claim 3, wherein the calculating the capacitive coupling value for the Mth sub-pixel comprises:

determining whether a polarity of the first initial voltage value is the same as a polarity of the second initial voltage value, and whether a polarity of the third initial voltage value is the same as a polarity of the fourth initial voltage value;

in response to the determination that the polarity of the first initial voltage value is the opposite to the polarity of the second initial voltage value and the polarity of the third initial voltage value is the opposite to the polarity of the fourth initial voltage value, calculating a first voltage difference between the first initial voltage value and the second initial voltage value and a second voltage difference between the third initial voltage value and the fourth initial voltage value; and calculating a sum of the first voltage difference value and the second voltage difference value, and determining the sum of the first voltage difference value and the second voltage difference value as the capacitive coupling value for the Mth sub-pixel.

6. The driving method of the display panel according to claim 3, wherein the calculating the voltage compensation value for the Mth sub-pixel based on the capacitive coupling value comprises:

determining whether an absolute value of the capacitive coupling value is greater than or equal to a preset threshold value; and in response to a determination that the absolute value of the capacitive coupling value is greater than or equal to the preset threshold value, calculating the voltage compensation value for the Mth sub-pixel based on the capacitive coupling value.

7. The driving method of the display panel according to claim 3, wherein the calculating the voltage compensation value for the Mth sub-pixel based on the capacitive coupling value comprises:

calculating the voltage compensation value according to following formula:

$$Reg=G_{coup}*\text{Gain}/\text{ImageHeight},$$

wherein Reg represents the voltage compensation value, $G_{coup}$ represents the capacitive coupling value, Gain represents a compensation coefficient, and ImageHeight represents number of pixel rows.

8. The driving method of the display panel according to claim 1, wherein the calculating the target voltage value for the Mth sub-pixel based on the voltage compensation value comprises:

calculating the target voltage value according to following formula:

$$V_{out}=V_{in}-Reg,$$

wherein $V_{out}$ represents the target voltage value, $V_{in}$ represents one of the initial voltage values of the Mth sub-pixel, and Reg represents the voltage compensation value.

9. The driving method of the display panel according to claim 1, wherein the displaying the second initial picture based on the target voltage value comprises:

obtaining the target voltage value of the Mth sub-pixel; and obtaining a target grayscale value corresponding to the target voltage value according to a preset look up table comprising a correspondence between grayscale values and the voltage values.

10. A display device comprising a display panel and a drive circuit electrically connected to the display panel, wherein:

the display panel comprises a first data line, a second data line adjacent to the first data line, and a sub-pixel column disposed between the first data line and the second data line, the sub-pixel column comprising N sub-pixels; and the driving panel comprises a chip, and the chip stores a computer program executable by the chip to perform a driving method of the display panel comprising:

obtaining first initial voltage values respectively corresponding to the N sub-pixels on the first data line in a first initial picture, second initial voltage values respectively corresponding to the N sub-pixels on the second data line in the first initial picture, third initial voltage values respectively corresponding to 1st to Mth sub-pixels of the N sub-pixels on the first data line in a second initial picture following the first initial picture, and fourth initial voltage values respectively corresponding to the 1st to Mth sub-pixels on the second data line in the second initial picture, wherein M is less than or equal to N, and both M and N are positive integers;

calculating a voltage compensation value for the Mth sub-pixel based on the first initial voltage value, the second initial voltage value, the third initial voltage value, and the fourth initial voltage value corresponding to the Mth sub-pixel;

calculating a target voltage value for the Mth sub-pixel based on the voltage compensation value; and displaying the second initial picture based on the target voltage value.

11. The display device according to claim 10, wherein the obtaining the first initial voltage values, the second initial voltage values, the third initial voltage values, and the fourth initial voltage values comprises:

receiving image data of the first initial picture and the second initial picture;

obtaining first grayscale values respectively corresponding to the N sub-pixels on the first data line in the first initial picture, second grayscale values respectively corresponding to the N sub-pixels on the second data line in the first initial picture, third grayscale values respectively corresponding to the 1st to Mth sub-pixels on the first data line in the second initial picture, and fourth grayscale values respectively corresponding to the 1st to Mth sub-pixels on the second data line in the second initial picture; and obtaining, based on a preset look up table comprising a correspondence between the grayscale values and the voltage values, the first initial voltage values respectively corresponding to the first grayscale values, the second initial voltage values respectively corresponding to the second grayscale values, the third initial voltage values respectively corresponding to the third grayscale values, and the fourth initial voltage values respectively corresponding to the fourth grayscale values.

12. The display device according to claim 10, wherein the calculating the voltage compensation value for the Mth sub-pixel comprises:

calculating a capacitive coupling value for the Mth sub-pixel based on the first initial voltage value, the second initial voltage value, the third initial voltage value, and the fourth initial voltage value corresponding to the Mth sub-pixel; and calculating the voltage compensation value for the Mth sub-pixel based on the capacitive coupling value.

13. The display device according to claim 12, wherein the calculating the capacitive coupling value for the Mth sub-pixel comprises:

determining whether a polarity of the first initial voltage value is the same as a polarity of the second initial voltage value, and whether a polarity of the third initial voltage value is the same as a polarity of the fourth initial voltage value; and in response to the determination that the polarity of the first initial voltage value is the same as the polarity of the second initial voltage value and the polarity of the third initial voltage value is the same as the polarity of the fourth initial voltage value, calculating a sum of the first initial voltage value, the second initial voltage value, the third initial voltage value, and the fourth initial voltage value; and determining the sum of the first initial voltage value, the second initial voltage value, the third initial voltage value, and the fourth initial voltage value as the capacitive coupling value for the Mth sub-pixel.

14. The display device according to claim 12, wherein the calculating the capacitive coupling value for the Mth sub-pixel comprises:

determining whether a polarity of the first initial voltage value is the same as a polarity of the second initial voltage value, and whether a polarity of the third initial voltage value is the same as a polarity of the fourth initial voltage value;

in response to the determination that the polarity of the first initial voltage value is the opposite to the polarity of the second initial voltage value and the polarity of the third initial voltage value is the opposite to the polarity of the fourth initial voltage value, calculating a first voltage difference between the first initial voltage value and the second initial voltage value and a second voltage difference between the third initial voltage value and the fourth initial voltage value; and calculating a sum of the first voltage difference value and the second voltage difference value, and determining the sum of the first voltage difference value and the second voltage difference value as the capacitive coupling value for the Mth sub-pixel.

15. The display device according to claim 12, wherein the calculating the voltage compensation value for the Mth sub-pixel based on the capacitive coupling value comprises:

determining whether an absolute value of the capacitive coupling value is greater than or equal to a preset threshold value; and in response to a determination that the absolute value of the capacitive coupling value is greater than or equal to the preset threshold value, calculating the voltage compensation value for the Mth sub-pixel based on the capacitive coupling value.

16. The display device according to claim 12, wherein the calculating the voltage compensation value for the Mth sub-pixel based on the capacitive coupling value comprises:

calculating the voltage compensation value according to following formula:

$$Reg=G_{coup}*\text{Gain}/\text{ImageHeight},$$

wherein Reg represents the voltage compensation value, $G_{coup}$ represents the capacitive coupling value, Gain represents a compensation coefficient, and ImageHeight represents number of pixel rows.

17. The display device according to claim 10, wherein the calculating the target voltage value for the Mth sub-pixel based on the voltage compensation value comprises:

calculating the target voltage value according to following formula:

$$V_{out}=V_{in}-Reg,$$

wherein $V_{out}$ represents the target voltage value, $V_{in}$ represents one of the initial voltage values of the Mth sub-pixel, and Reg represents the voltage compensation value.

18. The display device according to claim 10, wherein the displaying the second initial picture based on the target voltage value comprises:

obtaining the target voltage value of the Mth sub-pixel; and obtaining a target grayscale value corresponding to the target voltage value according to a preset look up table comprising a correspondence between grayscale values and the voltage values.

* * * * *